United States Patent [19]

Mizuno et al.

[11] Patent Number: 4,839,129
[45] Date of Patent: Jun. 13, 1989

[54] PROCESS FOR PRODUCING BIAXIALLY STRETCHED POLYPARAPHENYLENE SULFIDE FILM

[75] Inventors: Toshiya Mizuno, Tsuchiura; Hideyuki Yasumi, Iwaki; Satoru Matsunaga, Dejima, all of Japan

[73] Assignee: Kureha Kagaku Kogyo Kabushiki Kaisha, Tokyo, Japan

[21] Appl. No.: 215,544

[22] Filed: Jul. 6, 1988

Related U.S. Application Data

[62] Division of Ser. No. 33,613, Apr. 3, 1987, Pat. No. 4,775,571.

[51] Int. Cl.$^4$ .................. B29C 71/02; B32B 27/28; C08G 75/00; C08G 75/14
[52] U.S. Cl. ....................... 264/235; 264/211.12; 264/235.8; 264/237; 264/288.8; 264/290.2; 428/419; 528/388
[58] Field of Search ............ 264/210.1, 211.12, 211.13, 264/211.18, 211.2, 235, 235.8, 237, 288.8, 290.2, 346, 348; 428/419; 528/388

[56] References Cited

U.S. PATENT DOCUMENTS

| | | | |
|---|---|---|---|
| 3,562,199 | 2/1971 | Hill, Jr. et al. | 264/235 X |
| 4,286,018 | 8/1981 | Asakura et al. | 528/388 X |
| 4,370,469 | 1/1983 | Deguchi et al. | 528/388 |
| 4,426,479 | 1/1984 | Deguchi et al. | 428/419 X |
| 4,501,713 | 2/1985 | Wright | 264/235 X |
| 4,665,156 | 5/1987 | Reinking et al. | 528/388 |
| 4,769,190 | 9/1988 | Utsumi et al. | 264/235.8 X |

FOREIGN PATENT DOCUMENTS

| | | | |
|---|---|---|---|
| 55-34967 | 3/1980 | Japan | 264/290.2 |
| 55-34968 | 3/1980 | Japan | 264/290.2 |
| 56-62126 | 5/1981 | Japan | 264/290.2 |
| 56-62127 | 5/1981 | Japan | 264/290.2 |
| 56-62128 | 5/1981 | Japan | 264/290.2 |
| 58-208019 | 12/1983 | Japan | 264/235.8 |
| 60-96439 | 5/1985 | Japan | 264/235.8 |
| 61-92829 | 5/1986 | Japan | 264/290.2 |
| 2184977 | 7/1987 | United Kingdom | 264/290.2 |
| 2184978 | 7/1987 | United Kingdom | 264/290.2 |

*Primary Examiner*—Jeffery Thurlow
*Assistant Examiner*—Leo B. Tentoni
*Attorney, Agent, or Firm*—Oblon, Fisher, Spivak, McClelland & Maier

[57] ABSTRACT

Disclosed herein is a process for producing biaxially stretched polyparaphenylene sulfide film including the steps of melt-molding a polyparaphenylene sulfide resin into a sheet-form or film-form, rapidly chilling the thus molded sheet or film thereby obtaining an amorphous and non-stretched sheet or film, subjecting the amorphous and non-stretched sheet or film to thermal treatment for from 0.5 to 20 sec at a temperature of from 150° to 300° C., cooling the thus treated film or sheet to room temperature and subjecting the thus cooled film or sheet to biaxial stretching at a temperature of from 80° to 120° C.

4 Claims, 1 Drawing Sheet

PROCESS FOR PRODUCING BIAXIALLY STRETCHED POLYPARAPHENYLENE SULFIDE FILM

This is a division of application Ser. No. 07/033,613, filed Apr. 3, 1987 U.S. Pat. No. 4,775,571.

BACKGROUND OF THE INVENTION

The present invention relates to a biaxially stretched polyparaphenylene sulfide film excellent in slipping properties and an oil-impregnation property, and more in detail, the present invention relates to a biaxially stretched polyparaphenylene sulfide film having protuberances of an average height of from 0.3 to 2 $\mu$m and of an average diameter of the bottom part thereof from 5 to 40 $\mu$m in number of not less than $10^2$/mm$^2$ of the surface of the film, and a process for producing the biaxially stretched polyparaphenylene sulfide film, comprising the steps of melt-molding a resin of polyparaphenylene sulfide into a sheet-form or film-form, rapidly chilling the thus molded film or sheet, thereby obtaining an amorphous and non-stretched sheet or film, subjecting the thus obtained amorphous and non-stretched sheet or film to thermal treatment for from 0.5 to 20 sec at a temperature of from 150° to 300° C., cooling the thus treated sheet or film to room temperature and biaxially stretching the thus cooled sheet or film at a temperature of from 80° to 120° C.

As the industrial films (engineering plastic films), although polyethylene terephthalate films, polypropylene films, polyimide films, etc. have been exemplified, they are not sufficient as the film which can be formed by melt-processing, is excellent in various properties such as heat-resistance and is cheap in the production cost.

On the other hand, a resin of polyphenylene sulfide series (hereinafter, referred to as PPS) is excellent in heat-resistance and chemical resistance, and has been used for various uses as a material for incombustible films.

In the case where PPS films are used as a capacitor film or a base film for magnetic tape, by adding an inorganic filler, for instance, silica, carbon, glass, kaoline, calcium carbonate and calcium phosphate to PPS resin, the oil-impregnation property of the film is improved and a PPS film in which the running property of the tape is improved is produced.

However, in the case of the industrial production of the film of which the oil-impregnation property and the running property of the tape have been improved by adding the inorganic filler to PPS resin, various technical problems are caused.

For instance, although the thus added inorganic filler forms protuberances on the surface of the thus produced film, in the case where the affinity between the inorganic filler and the PPS resin is poor or the inorganic filler itself coagulates in the PPS resin, the formed protuberances vary in size. Such a situation is practically undesirable. Furthermore, the inorganic filler comes off as a white powder from the film during the running in the process of the production of the film, during the uses of the film as the magnetic tape or during the production of the capacitor resulting in an extremely inconvenient situation in the industrial processes for producing the goods.

Moreover, although the content of the inorganic filler in the base film for the magnetic tape is relatively small to PPS resin, since it has been well known that the performance of the film as the magnetic tape is lowered in the case where the unevenness of the surface of the film, which is formed by the inorganic filler, is too severe, the solution of the problem of how to make the surface of the film flat and smooth while maintaining the properties of the PPS film, such as the running property has been demanded.

On mixing the inorganic filler with PPS resin, there is a tendency that the electric specificity of the film, namely the electrical breakdown strength thereof, is reduced. Furthermore, there may be cases where a dielectric loss (tan $\delta$) of the film is raised by the water-absorption of the thus mixed inorganic filler. Since the dielectric loss is raised by using a relatively large amount of the inorganic filler, the increase of the dielectric loss causes the self-generation of heat in the capacitor film resulting in the destruction of the capacitor and therefore, the solution of the problem of suppressing the increase of the dielectric loss has also been demanded.

On the other hand, the PPS film prepared without adding the inorganic filler has the defects of being poor in the running property and also poor in the oil-impregnation property.

Accordingly, a biaxially stretched PPS film, which is excellent in slipping properties, a running property and an oil-impregnation property and does not contain the inorganic filler, has been earnestly desired.

As a result of the present inventors' studies, it has been found by the present inventors that a biaxially stretched polyparaphenylene sulfide film produced by the process comprising the steps of melt-molding PPS resin into a sheet-form or film-form, rapidly chilling the sheet or film, thereby obtaining an amorphous and non-stretched sheet or film, subjecting the amorphous and non-stretched sheet or film to thermal treatment for from 0.5 to 20 sec. at a temperature of from 150° to 300° C., cooling the thus treated sheet or film to room temperature and biaxially stretching the thus cooled sheet or film at a temperature of from 80° to 120° C. has the excellent slipping properties and an oil-impregnation property, is excellent in flatness and shows a small dielectric loss, and on the basis of the finding, the present invention have been attained.

SUMMARY OF THE INVENTION

In a first aspect of the present invention, there is provided a biaxially stretched polyparaphenylene sulfide film having protuberances on the surface of the film in number of not less than $10^2$/mm$^2$ of the surface thereof, an average diameter of the bottom part of the protuberance being from 5 to 40 $\mu$m and an average height of the protuberance being from 0.3 to 2 $\mu$m.

In a second aspect of the present invention, there is provided a process for producing a biaxially stretched polyparaphenylene sulfide film, comprising the steps of melt-molding a resin of the polyparaphenylene sulfide series into a sheet-form or a film-form, rapidly chilling the thus molded sheet or film, thereby obtaining an amorphous and non-stretched sheet or film, subjecting the amorphous and non-stretched sheet or film to thermal treatment for from 0.5 to 20 sec at a temperature of from 150° to 300° C., cooling the thus treated sheet or film to room temperature and subjecting the thus cooled sheet or film to biaxial stretching at a temperature of from 80° to 120° C., thereby obtaining the biaxially stretched polyparaphenylene sulfide film.

The object of the present invention is provided with a biaxially stretched polyparaphenylene sulfide film which has a flatness, slipping properties and an oil-impregnation property and is small in dielectric loss which is the cause of heat generation of the capacitor, while not adding the inorganic filler, etc. to a resin of polyparaphenylene sulfide series and solving the problem of a running property and an oil-impregnation property of the biaxially stretched polyparaphenylene sulfide film.

BRIEF DESCRIPTION OF THE DRAWING

Of the attached drawing.

DETAILED DESCRIPTION OF THE INVENTION

Figure 1:
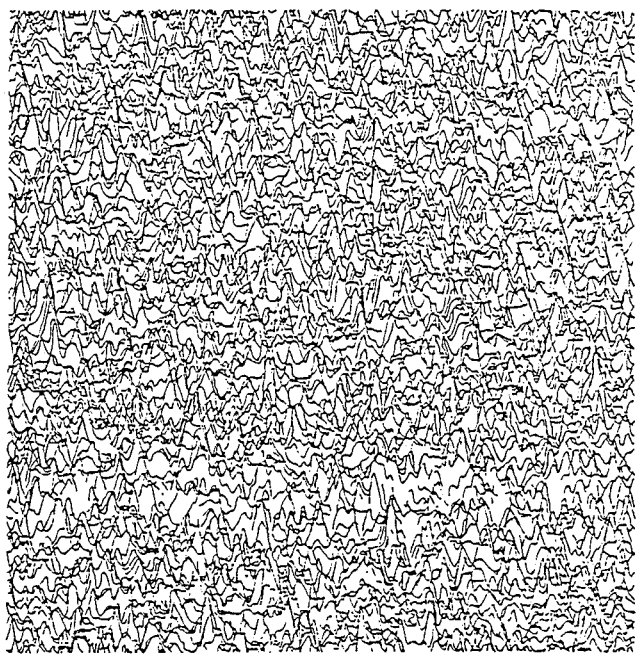
FIG. 1 is the figure of a three-dimensional surface roughness of the surface of a film of Example 1 measured by a surface microtopography and measuring instrument (made by TOKYO-SEIMITSU Co., Ltd., SURFCOM Model: 550).

As PPS resin according to the present invention, a homopolymer of paraphenylene sulfide and a copolymer composed of paraphenylene sulfide units as the main component may be exemplified. As the unit other than paraphenylene sulfide unit:

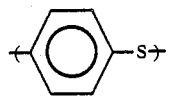

of the copolymer, metaphenylene sulfide unit:

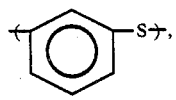

p,p'-diphenylenesulfone sulfide unit:

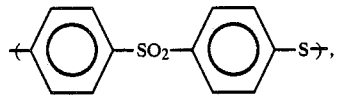

p,p'-diphenylene sulfide unit:

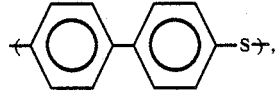

p,p'-diphenylene ether sulfide unit:

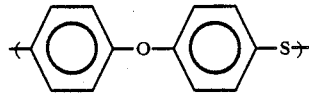

may be exemplified. Particularly, as PPS resin according to the present invention a block-copolymer of paraphenylene sulfide composed of the paraphenylene sulfide units and the metaphenylene sulfide units is preferable.

The homopolymer of paraphenylene sulfide according to the present invention may be produced by the conventional method, however, it is preferable that the homopolymer is linear and has a high molecular weight, and the homopolymer is produced by, for instance, the following methods.

(1) The process for producing a poly(arylene sulfide) of a high molecular weight, comprises the steps of reacting an alkali metal sulfide with a dihaloaromatic compound in a solvent of an organic amide and in the presence of from 0.5 to 2.4 mol of water to 1 mol of the alkali metal sulfide at a temperature of from 180° to 235° C., thereby forming a poly(arylene sulfide) of a melt viscosity of from 5 to 300 poise in a conversion rate of the dihaloaromatic compound of from 50 to 98 mol, and after adding water so that from 2.5 to 7.0 mol of water is present to 1 mol of the alkali metal sulfide further carrying out the reaction at a temperature of from 245° to 290° C. [refer to Japanese Patent Application Laid-Open No. 61-7332(1986)].

(2) The process for producing a poly(paraphenylene sulfide), comprises the steps of contacting at least one sulfur source, at least one p-dihalobenzene, at least one organic amide, at least one base and at least one alkali metal carbonate represented by the formula: RCOOM (wherein R represents a hydrocarbyl group and M represents an alkali metal), thereby forming a composition and maintaining the thus obtained composition at polymerization conditions of at a temperature of from 235° to 450° C. for from about 10 min to 72 hours to polymerize the composition [refer to Japanese Patent Publication No. 52-12240(1977)].

Furthermore, as the block-copolymer consisting essentially of the paraphenylene sulfide unit and the metaphenylene sulfide unit, for instance, the block-copolymer consisting essentially of the recurring unit (A):

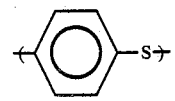

and the recurring unit (B):

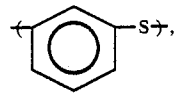

wherein the recurring unit (A) is present in the form of a block of from 20 to 5000 units on average thereof in a molecular chain of the block-copolymer, a molar fraction of the recurring unit (A) of the block-copolymer is in the range of from 0.50 to 0.98, the melt-viscosity ($\eta^*$) of the block-copolymer measured under the conditions of 310° C. at a shearing rate of 200 sec$^{-1}$ is from 50 to 100,000 poise, a glass-transition temperature (Tg) of the block-copolymer is from 20° to 80° C. and a crystalline melting point of the block-copolymer is from 250° to 285° C. may be exemplified. Such a block-copolymer is obtained by the following methods.

(I) The method comprises the steps of heating a non-proton-polar organic solvent containing p-dihalobenzene and an alkali metal sulfide, thereby forming a reaction liquid (C) containing a paraphenylene sulfide polymer in which an average polymerization degree of the recurring unit (A):

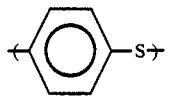

is from 20 to 5000, adding a dihaloaromatic compound substantially composed of m-dihalobenzene to the thus formed reaction liquid (C) and heating the thus prepared mixture in the presence of an alkali metal sulfide and a non-proton-polar organic solvent, thereby forming the block-copolymer of paraphenylene sulfide which consists essentially of the block of the recurring unit (A) and the recurring unit (B):

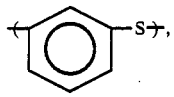

and has a molar fraction of the recurring unit (A) of from 0.50 to 0.98 a melt-viscosity ($\eta^*$) of from 50 to 100,000 poise (measured under the condition of the shearing rate of 200 sec$^{-1}$ at 310° C.), a glass transition temperature (Tg) of from 20° to 80° C. and a crystalline melting point (Tm) of from 250° to 285° C.

(II) The method comprises the steps of heating a non-proton-polar organic solvent containing a dihaloaromatic compound composed m-dihalobenzene and an alkali metal sulfide, thereby forming a reaction liquid (E) containing a metaphenylene sulfide polymer composed of the recurring unit (B):

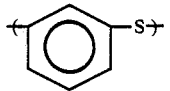

having an average polymerisation degree of not less than 2 and in the range of from $$\left(20 \times \frac{1-Y}{Y}\right) \text{to} \left(5000 \times \frac{1-Y}{Y}\right),$$

wherein Y is a molar fraction of the recurring unit (A) of the thus formed block-copolymer in the range of from 0.50 to 0.98, adding paradihalobenzene to the thus formed reaction liquid (E) and heating the thus obtained mixture in the presence of an alkali metal sulfide and a non-proton-polar organic solvent to obtain the block-copolymer of paraphenylene sulfide consisting essentially of a recurring unit (B) and the recurring unit (A):

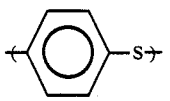

and having a molar fraction of the recurring unit (A) of from 0.50 to 0.98 a melt-viscosity ($\eta^*$) of from 50 to 100,000 poise (measured under the condition of the shearing rate of 200 sec$^{-1}$ at 310° C.), a glass transition temperature (Tm) of from 20° to 80° C. and a crystalline melting point of from 250° to 285° C. [refer to Japanese Patent Application Laid-Open No. 61-14228(1986)].

In the conventional technique, PPS resins produced by the methods exemplified above are melt-molded into sheet or film form from a T-die and then the thus molded sheet or film is rapidly chilled to obtain an amorphous and non-stretched sheet or film. The thus obtained sheet or film is successively or simultaneously subjected to biaxial stretching at a temperature in the vicinity of the glass transition temperature of PPS resin and is heat-set to be the film which is put into practical use.

In contrast with the consideration of stretching PPS film only in the amorphous state according to the present invention, PPS film is preliminarily subjected to thermal treatment and then crystallized. The thus obtained film, in spite of the fact that the film has been partially crystallized, can be subjected to stretching and the surface thereof has been roughed and has the extremely uniform protuberances thereon.

According to the present invention, the amorphous PPS sheet or film obtained by the rapid chilling is subjected to thermal treatment for 0.5 to 20 sec, preferably from 1 to 5 sec at a temperature of from 150° to 300° C., preferably from 200° to 280° C., thereby partially crystallizing PPS film, and the thus partially crystallized sheet or film is subjected to biaxial stretching thereby making a surface of the film rough.

Namely, according to the present invention, films, sheets, etc. are formed by the melt-forming method from PPS resin produced by the above-exemplified method. As the melt-forming method, the press method and the film-forming method wherein PPS resin is extruded from an extruder as a film while using a T-die or a circular die may be exemplified.

The film or sheet processed by the melt-forming method is rapidly chilled by air, water, chilled roll, etc. preferably at a cooling speed of not less than 10° C./sec.

It is necessary to bring PPS film or sheet in the amorphous state by rapidly chilling the extruded PPS film or sheet, and in the case where the extruded PPS film or sheet is slowly cooled, since the whole film or sheet is crystallized, it becomes difficult to carry out the stretching.

In the next place, the amorphous and non-stretched film or sheet obtained by rapidly chilling the extruded PPS film is subjected to thermal treatment for from 0.5 to 20 sec, preferably from 1 to 5 sec at a temperature of from 150° to 300° C., preferably from 200° to 280° C. By the above-mentioned thermal treatment, only the surface of the film or sheet is crystallized, and then the thus treated film or sheet is biaxially stretched, thereby making the surface of the film or sheet rough.

Since the above-mentioned thermal treatment is carried out in a short period, the inner part of the film or sheet is kept in an amorphous state and accordingly, it is possible to easily stretch the film or sheet in such a state. Furthermore, since the surface of the thus treated film or sheet has been crystallized, it is possible to form a minutely rough surface of the film or sheet by the stretching.

In the case where the thermal treatment is carried out at a temperature of less than 150° C., the crystallization speed is low and crystallization scarcely occurs even on the surface of the film or sheet. On the other hand, in the case where the thermal treatment is carried out at a temperature of more than 300° C., the film or sheet melts resulting in the deformation of the film or sheet. Accordingly, these cases are unfavorable.

In the case where the period of the thermal treatment is less than 0.5 sec, the crystallization scarcely proceeds, and on the other hand, in the case where the period of the thermal treatment is more than 20 sec, the whole film or sheet begins to crystallize resulting in the difficulty of carrying out the stretching. Accordingly, these cases are unfavorable.

The thermal treatment may be carried out by contacting the film or sheet with a heated gas such as hot air. Furthermore, the thermal treatment may be carried out by contacting the film or sheet with a heated metal roll or a heated liquid.

The roughness of both surfaces of the film or sheet can be obtained by heating the whole the film or sheet in the thermal treatment and then stretching the thus heated film or sheet. Further, in the case where only one of the surfaces of the film or sheet is subjected to the thermal treatment, it is possible to obtain a film or sheet having only one roughed surface after having stretched.

Both surfaces of the film or sheet prepared by adding an inorganic filler to PPS resin for obtaining a film or sheet having a rough surface and are necessarily roughed. On the other hand, according to the present invention, the roughness on both surfaces of the film or sheet, or the roughness only on one surface of the film or sheet can be easily carried out.

The biaxial stretching of the thus thermally treated, amorphous and non-stretched film or sheet can be carried out by a publicly known method. For instance, the amorphous sheet or film is biaxially stretched simultaneously or successively at a temperature of from 80° to 120° C., preferably 90° to 115° C. and at a stretching ratio of from 1.5 to 5 times, preferably 3 to 4 times (machine direction and transverse direction) by a roll method or a tenter method.

The thus stretched film is heat-set at a temperature of from 200° to 280° C., preferably 240° to 270° C. while retaining the film under a tension. The period for heat-setting depends on the properties required on the product, however, it is from 3 sec to several tens of minutes, preferably from 3 to 600 sec.

By the heat-set treatment for from 3 sec to several tens of minutes, crystallization substantially proceeds and as a result, a thermally stabilized film can be obtained.

The thus obtained biaxially stretched PPS film is flat and has excellent slipping properties, and a kinetic friction coefficient between the films at 20° C. and RH of 70% is not more than 0.6, preferably not more than 0.4, and a center-line average roughness (Ra) of the film is from 0.02 to 0.5 μm.

The kinetic friction coefficient of the film is measured according to ASTM D-1894, and the center-line average roughness (Ra) of the film is measured according to Japanese Industrial Standards (JIS) B 0601 while using a surface microtopography and measuring instrument (made by TOKYO-SEIMITSU Co., Ltd., SURFCOM Model: 550).

The biaxially stretched film according to the present invention has the protuberances of an average diameter of from 5 to 40 μm and of an average height of from 0.3 to 2 μm in number of not less than $10^2/mm^2$ preferably not less than $5 \times 10^2/mm^2$ of the surface thereof.

As has been stated, the biaxially stretched PPS film according to the present invention has a kinetic friction coefficient of not more than 0.6, preferably not more than 0.45 at 20° C. and RH of 70% and a center-line average roughness (Ra) of from 0.02 to 0.5 μm, preferably from 0.03 to 0.5 μm, and protuberances of an average diameter of from 5 to 40 μm and an average height of from 0.3 to 2 μm, which consist of polyphenylene sulfide resin, in number of not less than $10^2/mm^2$, preferably not less than $5 \times 10^2/mm^2$ of the surface thereof. Accordingly, a biaxially stretched PPS film according to the present invention has a flatness, has excellent slipping properties and oil-impregnation property, and is low in a dielectric loss which is the cause of generation of heat in the capacitor.

The present invention will be explained more in detail while referring to the non-limitative Examples as follows.

EXAMPLE 1

Into an autoclave of a capacity of 20 litres, 8.0 kg of N-methylpyrrolidone (hereinafter referred to as NMP) and 21.0 mol of sodium sulfide pentahydrate ($Na_2S \cdot 5H_2O$) were introduced, and the content of the autoclave was heated to about 204° C. to distill the moisture from the content (the loss of sulfur discharged as $H_2S$) was 2.7 mol % of the introduced amount of $Na_2S \cdot 5H_2O$ and the amount of moisture in the autoclave was 26.4 mol). Thereafter, 19.8 mol of m-dichlorobenzene (hereinafter referred to as m-DCB) and 3.12 kg of NMP were introduced into the autoclave (the calculated concentration of sodium sulfide in the liquid mixture being 1.343 mol/kg). After substituting the aerial space of the autoclave with nitrogen gas, the content was subjected to polymerization for 2 hours at 220° C. and then subjected to reaction for 8 hours at 230° C. to prepare a liquid reaction mixture (hereinafter referred to as "A" liquid). The thus prepared "A" liquid was drawn out from the autoclave and preserved.

After sampling a small amount of "A" liquid, the specimen was measured for the polymerization degree of the thus formed prepolymer of m-phenylene sulfide according to the GPC method. The polymerization degree of the prepolymer was 30.

Separately, into an autoclave of 20 litres, 7.0 kg of NMP and 17.0 mol of sodium sulfide pentahydrate ($Na_2S \cdot 5H_2O$) were introduced, and by heating the content of the autoclave to about 200° C., the moisture was distilled out from the autoclave (the loss of sulfur was 2.7 mol % and the moisture in the autoclave was 18.3 mol). Thereafter, 16.87 mol of p-dichlorobenzene (hereinafter referred to as p-DCB), 6.51 mol of water, 2.38 kg of NMP and 2.174 kg of "A" liquid were introduced into the autoclave, and after substituting the aerial space of the autoclave by nitrogen gas, the content was subjected to reaction for 10 hours at 210° C. and after further adding 1.24 kg of water into the autoclave, the content was subjected to reaction for 5 hours at 260° C.

After the reaction was over, the liquid reaction mixture was subjected to filtration, and the thus obtained precipitate was washed with hot water and then dried under a reduced pressure to collect a block-copolymer. On measuring the molar fraction (X) of the recurring unit (B):

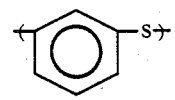

belonging to the block of the thus obtained block-copolymer by infrared analysis, X was 0.15. The melt viscosity ($\eta^*$) of the block-copolymer measured under the conditions of the temperature of 310° C. and the shearing rate of 200 sec$^{-1}$ by a KOKA-type flow tester was 3700 poise.

The thus obtained block-copolymer was extruded into a rod of about 2 mm in diameter by an extruder maintained at a temperature of 300° C. and the rod was pelletized.

The thus obtained pellets were extruded into a sheet-form from an extruder provided with a T-die at a resin temperature of 320° C., and the thus extruded sheet was cooled on a casting roll at 75° C. to obtain a sheet of a thickness of about 200 μm.

The thus obtained sheet was cut into pieces of 15 cm in length and 15 cm in width, and the pieces were fixed in all their periphery on a metal frame and subjected to thermal treatment in a gear oven at 260° C. for 2 sec.

The thus thermally treated and then air-cooled piece of the sheet had the crystallized surface, and the center-line average roughness (Ra) was 0.045 μm.

The thus air-cooled piece of the sheet was simultaneously subjected to biaxial stretching at 95° C. and at a stretching ratio of 3.5 times (machine direction and transverse direction) by a biaxial stretching machine (made by T. M. Long Co.) to obtain a biaxially streched film of 16 μm in thickness.

The center-line average roughness (Ra) of the thus obtained film was 0.23 μm. As a result of examining the surface of the thus obtained biaxially stretched film by the surface microtopography and measuring instrument (made by TOKYO-SEIMITSU Co., Ltd., SURFCOM, model: 550), the figure of surface roughness shown in FIG. 1 was obtained. From FIG. 1, it was found that the average diameter of the bottom part of the protuberances on the surface of the film was 20 μm and the average height of the protuberances was 0.8 μm, and that the number of the protuberances was 600/mm² of the surface of the film. Further, on measuring the kinetic friction coefficient between the films according to ASTM D-1894 while using the TR-type friction tester (made by TOYO-SEIKI Co., Ltd.), the kinetic friction coefficient between the films was 0.35, namely, the film is excellent in the slipping properties.

The contact angle of the thus obtained film after 2 min of dropping a capacitor impregnating oil (cumylphenylethane, made by KUREHA Chem. Ind. Co., Ltd., KIS-100) at room temperature was 3°.

EXAMPLES 2 and 3, and COMPARATIVE EXAMPLE 1

Each of the rapidly cooled sheets of 200 μm in thickness, which had been produced in the same manner as in Example 1, was fixed onto a metal frame as in Example 1, and was subjected to thermal treatment in a gear oven under the following conditions shown in Table. Then the thus treated film was biaxially stretched under the same conditions as in Example 1 to obtain the biaxially stretched film. The surfce of the thus obtained, biaxially stretched film was measured as in Example 1, the results being shown in Table.

TABLE

| | Conditions of thermal treatment | | Properties of film after biaxial stretching | |
|---|---|---|---|---|
| | Temperature (°C.) | Time (sec) | Center-line average roughness (Ra) (μm) | Kinetic friction coefficient |
| Example 2 | 250 | 2 | 0.20 | 0.35 |
| Example 3 | 220 | 6 | 0.08 | 0.38 |
| Comparative Example 1 | 260 | 50 | the film could not be biaxially stretched | |

The pattern of the film in Examples 2 and 3 was the same as that in FIG. 1 of Example 1, and the film of Example 2 had the protuberances of an average diameter of the bottom part thereof of 18 μm and of an average height thereof of 0.7 μm in number of 900/mm² of the surface thereof, and the film of Example 3 had the protuberances of an average diameter of the bottom part thereof of 10 μm and of an average height thereof of 0.3 μm in number of 1500/mm² of the surface thereof. Furthermore, as a result of measuring the contact angle of the film as in Example 1, the contact angle of the film of Example 2 was 3° and the contact angle of the film of Example 3 was 4°.

EXAMPLE 4

Into an autoclave of a capacity of 20 litres, 8.0 kg of NMP and 20.0 mol of sodium sulfide pentahydrate (Na$_2$S.5H$_2$O) were introduced, and the content was heated to about 200° C. thereby distilling the moisture out from the autoclave (the loss of sulfur as hydrogen sulfide was 1.4 mol % of the introduced amount of sodium sulfide pentahydrate (Na$_2$S.5H$_2$O) and the amount of moisture in the autoclave was 27 mol). Thereafter, 20.1 mol of p-DCB and 3.1 kg of NMP were introduced into the autoclave, and after substituting the aerial space of the autoclave with nitrogen gas, the content was subjected to polymerization for 10 hours at 210° C. and after further adding 53 mol of water into the autoclave, the content was subjected to reaction for 5 hours at 260° C. After the reaction was over, the liquid reaction mixture was subjected to filtration and the thus collected precipitate was washed with hot water and then dried under a reduced pressure to obtain poly(p-phenylene sulfide).

The thus obtained poly(p-phenylene sulfide) was extruded into a rod-form of about 2 mm in diameter by an extruder maintained at a temperature of 310° C., and the thus extruded rod was pelletized. The thus obtained pellets were extruded into a sheet-form from an extruder provided with a T-die at 320° C. of the resin temperature, and the thus extruded sheet was chilled on the casting rolls at 87° C. to obtain a sheet of about 200 μm in thickness.

The thus obtained sheet was subjected to thermal treatment for about 3 sec at 260° C. in the same manner as in Example 1, and the thus treated sheet was subjected to biaxial stretching at a stretching ratio of 3.5 times (machine direction and transverse direction) at 105° C. by the biaxial stretching machine (made by T. M. Long Co.) to obtain a biaxially stretched film of 15 μm in thickness.

The center-line average roughness (Ra) of the thus obtained film was 0.18 μm, and the kinetic friction coefficient of the film was 0.38, namely it was the film excellent in the slipping properties.

The pattern of the surface of the film was the same as that in FIG. 1, and the film had the protuberances in number of 1000/mm² of the surface thereof and the average diameter of the bottom part of the protuberance was 15 μm and the average height of the protuberance was 0.6 μm.

What is claimed is:

1. A process for producing a biaxially stretched polyparaphenylene sulfide film, comprising the steps of melt-molding a resin of polyparaphenylene sulfide series into a sheet-form or a film-form, rapidly chilling the thus molded sheet or film, thereby obtaining an amorphous and non-stretched sheet or film, subjecting the amorphous and non-stretched sheet or film to thermal treatment for from 0.5 to 20 sec at a temperature of from 150° to 300° C., cooling the thus treated sheet or film to room temperature and subjecting the thus cooled sheet or film to biaxial stretching at a temperature of from 80° to 120° C., thereby obtaining the biaxially stretched polyparaphenylene sulfide film.

2. A process according to claim 1, wherein the rapid chilling of the molded sheet or film is carried out at a chilling speed of not less than 10° C./sec.

3. A process according to claim 1, wherein said amorphous and non-stretched sheet or film is subjected to thermal treatment for from 1 to 5 sec at a temperature of from 200° to 280° C.

4. A process according to claim 1, wherein said film subjected to the biaxial stretching is heat-set for from 3 sec to several tens of minutes at a temperature of from 200° to 280° C.

* * * * *

UNITED STATES PATENT AND TRADEMARK OFFICE
CERTIFICATE OF CORRECTION

PATENT NO. : 4,839,129

DATED : June 13, 1989

INVENTOR(S) : Toshita MIZUNO, et al

It is certified that error appears in the above-identified patent and that said Letters Patent is hereby corrected as shown below:

On the Title Page, Item [30], the Foreign Application Priority Data has been omitted, it should read as follows:

--Apr. 14, 1986 [JP] Japan ............ 85762/86--

Signed and Sealed this

Twentieth Day of March, 1990

Attest:

JEFFREY M. SAMUELS

Attesting Officer

Acting Commissioner of Patents and Trademarks